United States Patent
Holdaway et al.

(10) Patent No.: US 7,721,155 B2
(45) Date of Patent: May 18, 2010

(54) I2C FAILURE DETECTION, CORRECTION, AND MASKING

(75) Inventors: Kevan D. Holdaway, Hillsborough, NC (US); Gregg S. Lucas, Tucson, AZ (US); Ivan R. Olguin, II, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 362 days.

(21) Appl. No.: 11/769,613

(22) Filed: Jun. 27, 2007

(65) Prior Publication Data
US 2009/0006889 A1 Jan. 1, 2009

(51) Int. Cl.
G06F 11/00 (2006.01)
(52) U.S. Cl. .......................................... 714/43
(58) Field of Classification Search ........................ None
See application file for complete search history.

(56) References Cited

U.S. PATENT DOCUMENTS

| | | | |
|---|---|---|---|
| 6,237,112 B1 | 5/2001 | Yoo et al. | |
| 6,718,488 B1 * | 4/2004 | Jue et al. | 714/43 |
| 6,728,908 B1 | 4/2004 | Fukuhara et al. | |
| 6,874,052 B1 * | 3/2005 | Delmonico | 710/305 |
| 7,016,993 B2 | 3/2006 | Lee | |
| 7,020,076 B1 | 3/2006 | Alkalai et al. | |
| 2004/0255195 A1 | 12/2004 | Larson et al. | |
| 2007/0240019 A1 * | 10/2007 | Brady et al. | 714/43 |

FOREIGN PATENT DOCUMENTS

| | | |
|---|---|---|
| JP | 7152463 A | 6/1995 |
| JP | 2003242048 A | 8/2003 |
| WO | 03005211 A2 | 1/2003 |

* cited by examiner

*Primary Examiner*—Michael C Maskulinski
(74) *Attorney, Agent, or Firm*—Griffiths & Seaton PLLC (57) ABSTRACT

A method of operation of a computer system having a master and slave Inter-IC (I2C) bus network includes detecting and isolating an I2C bus failure, configuring a failed I2C bus as offline, reconfiguring a remaining I2C bus as a multi-mastered bus, and masking the failed I2C bus from operation until the failed I2C bus can be repaired. A first test request is sent to a remote device from a local device. If the remote device receives the first test request, a remote bus mode is switched to a failure position, a local bus mode is switched to a multi-master position, and a second request is sent to the remote device to indicate position changes.

16 Claims, 7 Drawing Sheets

I2C FAILURE DETECTION, CORRECTION, AND MASKING

BACKGROUND OF THE INVENTION

1. Field of the Invention

The present invention relates in general to computers, and more particularly to a method of detecting a failure, correction and failover, and masking in SMBus or I2C networks.

2. Description of the Prior Art

A common interface used in computer systems, including computer storage systems is the so-called "SMBus", Inter-IC bus or I2C bus. I2C is commonly used to connect devices that need to share information. A typical setup includes a master and a slave device. When both devices have the capability to be master devices, two (2) I2C buses are often used with each device acting as both a master device on a first bus and a slave on the second bus. This allows both devices to send messages when needed.

I2C is known to have reliability problems. First, failure can be caused by damaged hardware, which can result in a non-recoverable error. In general, the typical response to a master device not receiving a response from a slave device is to simply retry the connection. An I2C failure can cause a significant disruption for a computer system. For example, an I2C failure in a storage subsystem can incur delays and require a large increase in computing resources. Regular two-way communication is important to ensure proper operation.

SUMMARY OF THE INVENTION

In a dual I2C bus communication system, three problems must be addressed. The first problem concerns detection of the I2C failure. The second problem concerns so-called "failing over" to a remaining known good I2C bus. The failed hardware can be masked with software so that the computer system can continue bi-directional communications. Finally, the third problem concerns attempting to recover the failed bus. A method which addresses these problems should be adapted to incorporate existing computer resources, so as to minimize expense and resource allocation.

Accordingly, in one embodiment, the present invention is a method of operation of a computer system having a master and slave Inter-IC (I2C) bus network, which includes detecting and isolating an I2C bus failure. As an additional step, the method can then configure a failed I2C bus as offline, and reconfigure a remaining I2C bus as a multi-mastered bus. Finally, as an additional step, the method can mask a failed I2C bus from operation until the failed I2C bus can be repaired.

In another embodiment, the present invention is a method of masking an Inter-IC (I2C) bus failure in a master/slave I2C bus network, comprising adding a data field to messages sent over the master/slave I2C bus network to indicate bus states of both buses in the bus network, and a message count, and detecting a failed I2C bus, wherein if a first device having a failed master I2C bus has a first message for a second device, the first message is queued, the message count is updated, and the first device waits for the second device to receive a second message over the slave I2C bus; and if the first device having a failed slave I2C bus has the first message for the second device, the first device polls the second device, wherein if the message count is zero (0), the first device waits for a predetermined period of time and re-polls the second device, and if the message count is not zero, the first device extracts at least one message from the second device over the master I2C bus. The data field does not have to be part of every data packet payload sent over the bus network, but rather part of a proprietary command used to extract messages over the bus network.

In still another embodiment, the present invention is an article of manufacture including code for operating a computer system having a master and slave Inter-IC (I2C) bus network, wherein the code is capable of causing operations to be performed comprising detecting and isolating an I2C bus failure, configuring a failed I2C bus as offline, reconfiguring a remaining I2C bus as a multi-mastered bus, and masking the failed I2C bus from operation until the failed I2C bus can be repaired.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE PREFERRED EMBODIMENTS OF THE INVENTION

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, punch card, flash memory, integrated circuits, or other digital processing apparatus memory device.

The schematic flow chart diagrams included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
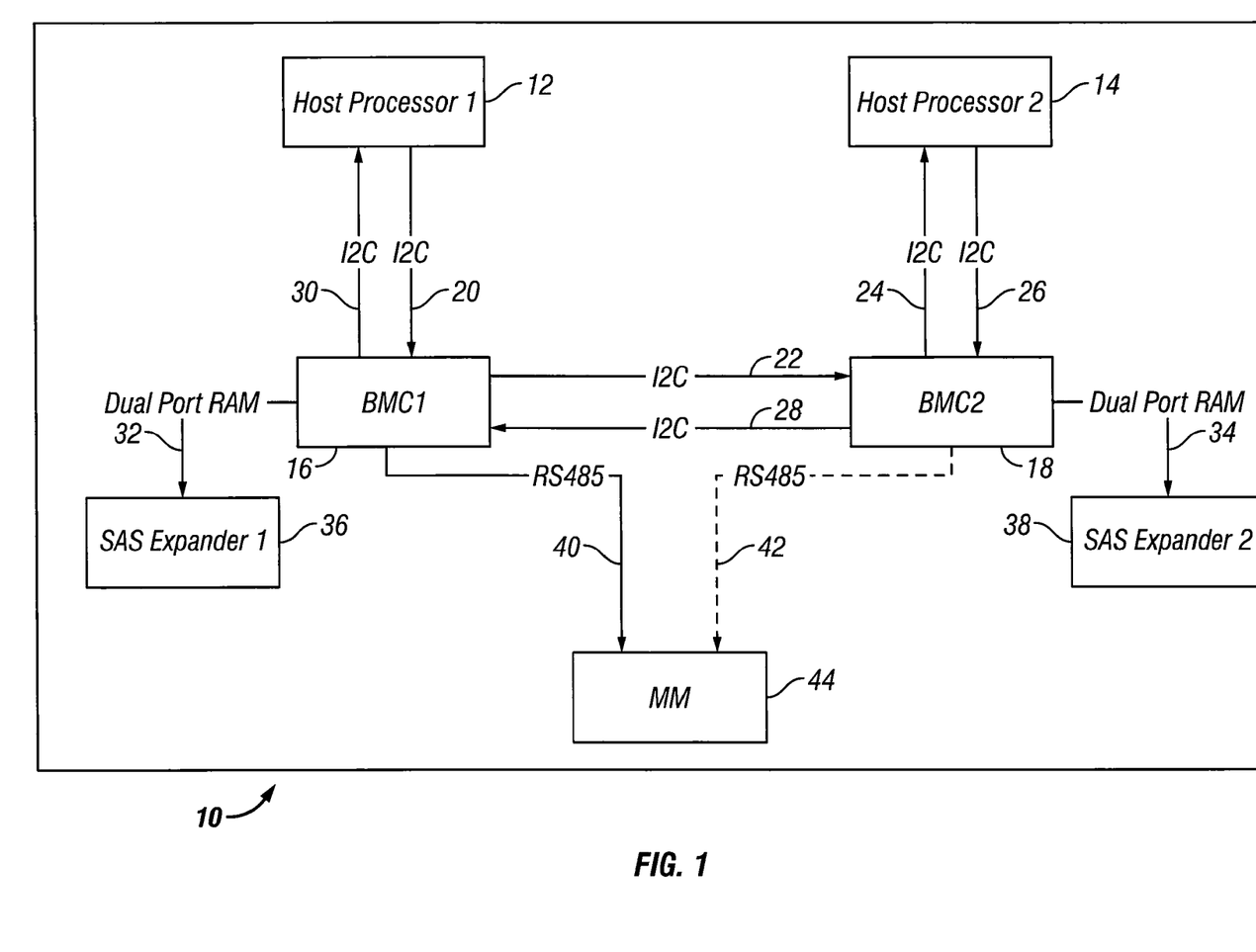
FIG. 1 illustrates an example of a computer system environment having an example storage controller environment in which an I2C bus communications network is implemented.

Turning to FIG. 1, an exemplary computer system 10 is depicted which can implement various aspects of the present invention. Computer system 10 includes components directed toward a storage subsystem, including host processor modules 12 and 14, and baseboard management controller modules 16 and 18. Host processor 12 communicates over a first I2C bus 20 to controller 16. Likewise, the controller 16 communicates with controller 18 via I2C bus 22, and to host processor 14 via I2C bus 24. Two-way communication over the I2C bus network is attained via communication from processor 14 over I2C bus 26 to controller 18, through bus 28 to controller 16, and through bus 30 to processor 12. Dual port random access memory (RAM) modules 32 and 34 are connected to serial attached SCSI (SAS) expander modules 36 and 38. Finally, RS485 communication paths 40 and 42 connect processor modules 16 and 18 with module 44 as shown.

In one embodiment, the present invention describes a mechanism that can be implemented to detect and isolate an I2C bus failure. Once the failure is identified, the failed interface can be taken offline. An attempt to recover the failed bus can take place. Subsequent to a continuing failure, the remaining Master/Slave I2C bus can be reconfigured to operate as a multi-mastered bus as a first alternative. In a second alternative, the remaining I2C bus cannot be reconfigured as a multi-mastered bus. To ensure that the storage blade continues to operate correctly, software can mask the failed bus errors until the errors can be corrected. Initially, when both I2C busses are operating correctly, devices can send messages to other devices using the normal Master/Slave I2C communication protocol. After the error state is detected, the devices begin an alternate operation which allows the devices to continue operation as a single I2C bus (albeit not with optimal performance).

During normal operation, devices such as controller 16 conserve most of their respective computing power for performing assigned tasks. During normal operation, the activity of so-called "polling" a partner device for message is taxing an computing power and should be avoided. Each device relies on the dual I2C setup to ensure that messages sent over the communications network are delivered promptly. When the devices detect a failed I2C, the devices then devote additional computing power to ensure that priority messages are delivered promptly according to an exemplary method of operation described below.

Figure 2:
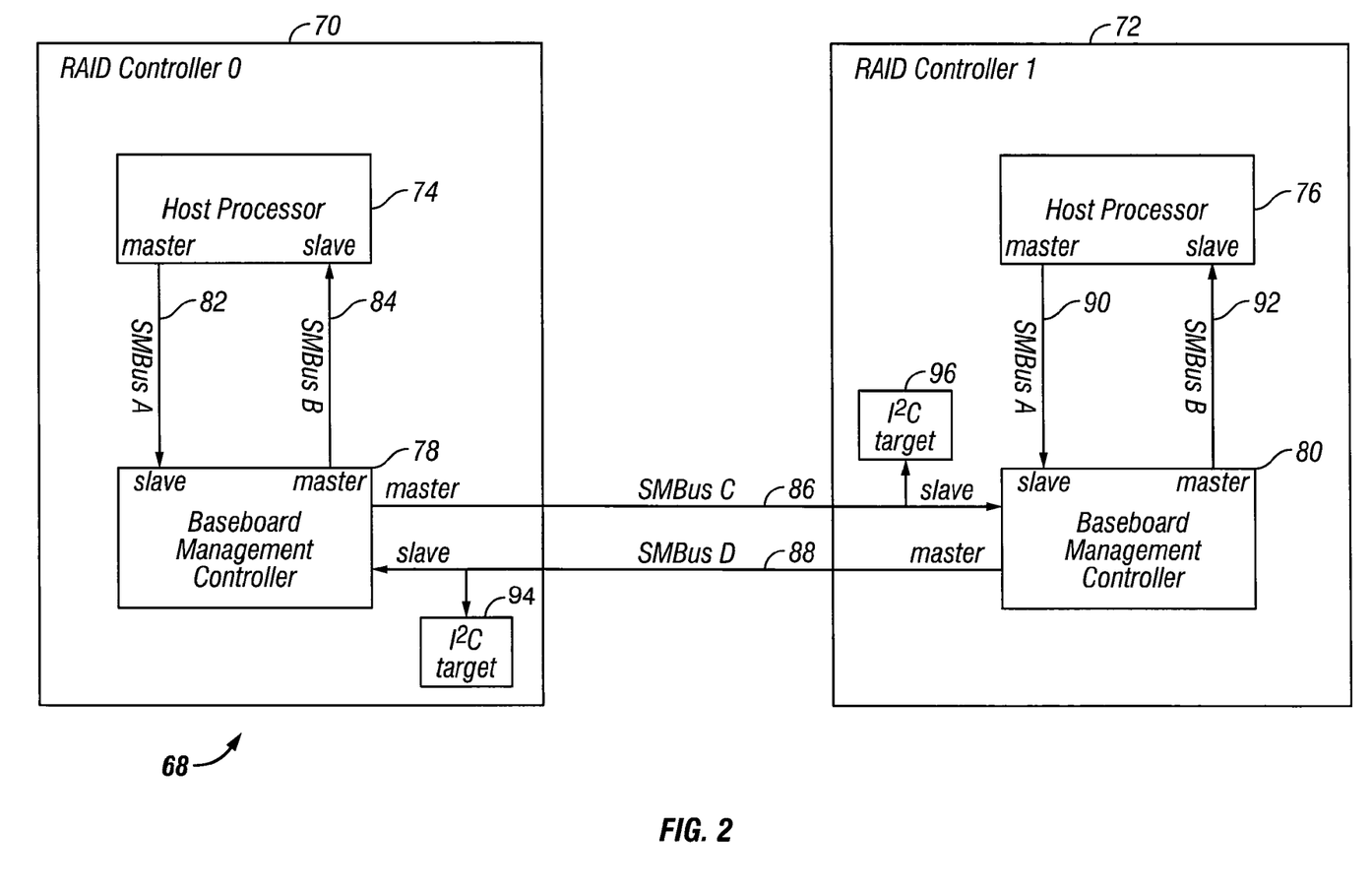
FIG. 2 illustrates an exemplary SMBus network communications scheme.

Once the failure is detected and isolated, the failed bus is taken offline. FIG. 2 illustrates an example SMBus configuration 68 in an example storage environment. A pair of redundant array of independent disks (RAID) controllers 70 and 72 each include a host processor 74 and 76, and a baseboard management controller 78 and 80. In a manner similar to that shown in FIG. 1, processor 74 communicates from it's Master port over SMBus A (82) to the Slave port of controller 78. Controller 78 communicates requests from its Master port over SUBus B (84) to the respective Slave port in processor 74. Similarly, communication proceeds from the Master port of controller 78 over bus 86 to the Slave port of the controller 80, and from the Master port of controller 80 over bus 88 to the Slave port of controller 78, and over busses 90 and 92, respectively as shown. An I2C target 94 is connected to bus 88, and an I2C target 96 is connected to bus 86 as shown.

Consider an Example A of an SMBus network recovery scheme, in which as a preliminary matter, the SMBus D (88) is hung. Using a detection algorithm such as that previously described, the device 70 detects that the bus 88 is hung. As part of this protocol, a reset command can be issued by the device 70, which controls the hung Slave I2C device for SMBus D, to the power switching device field effect transistor (FET) that controls power to the Slave device 94.

Figure 3:
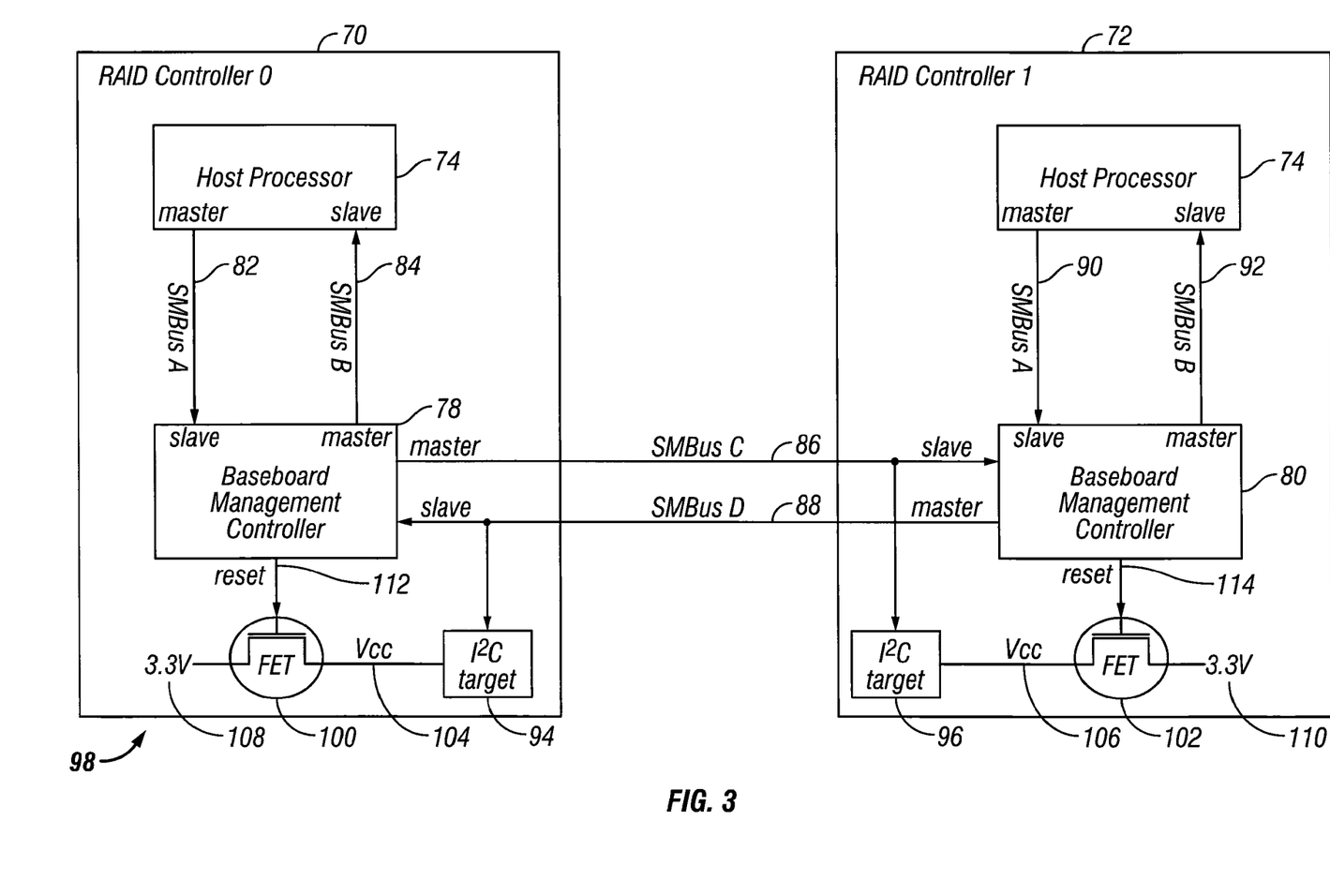
FIG. 3 illustrates an exemplary SMBus network recovery according to one embodiment of the present invention.

FIG. 3 illustrates an SMBus configuration 98 which includes the SMBus configuration 68 including the FET switching devices 100 and 102 that control power to slave devices 94 and 96 as depicted. Devices 100 and 102 receive 3.3 V of operational power 108, and 110 as shown. The FET devices 100 and 102 are connected to the Slave I2C targets via nodes 104 and 106.

Upon sequencing the slave device power domain, the slave devices 94 can initiate a boot sequence and become operational. Device 70 sends a message to device 72 using SMBus C (86). The message instructs device 72 to reset SMBus D (88). The originally hung I2C bus 88 is now operational.

Figure 4:
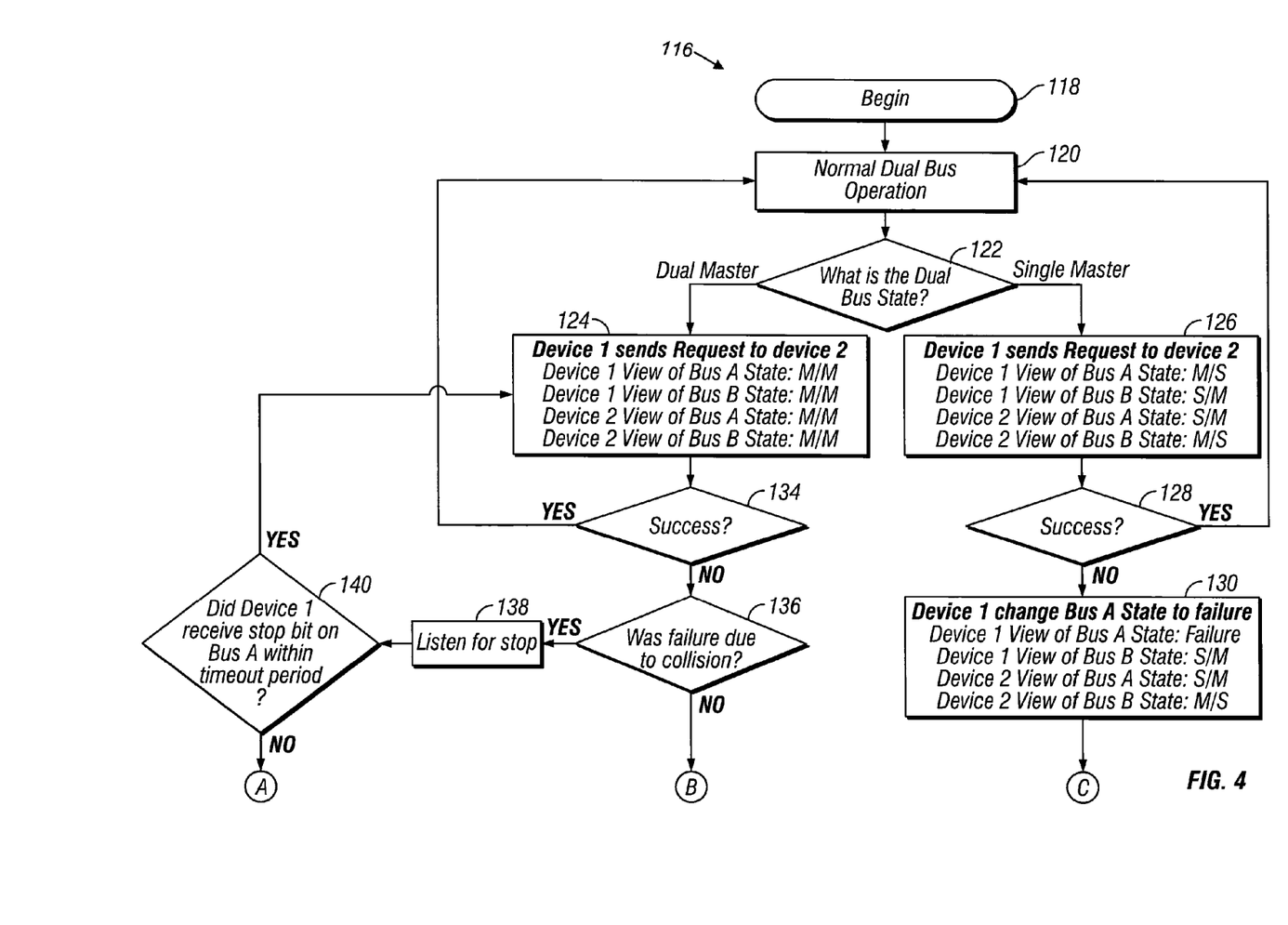
FIG. 4 illustrates a flow chart diagram of an exemplary method to detect a bus failure.

FIG. 4 illustrates an exemplary method of operation to detect a bus failure. There are generally four modes in which an I2C bus can operate. The notation "M/S" indicates that a device is a Master on this respective bus, and that the partner device is a Slave. The notation "S/M" indicates that a device is a Slave on this respective bus, and that the partner device is a Master. The notation "M/M" indicates that the respective bus is operating as a multi-master bus. Finally, the notation "Failure" indicates that a respective bus has failed.

The method begins (step 118) with a computer system carrying out normal dual I2C bus operations (step 120). The method queries as to what is the current dual bus state (step 122). If the dual bus state is dual master, the first device sends a request to the second device (step 124). The various modes of each device are depicted. For example, the first device's view of Bus A's state is multi-master. If the request is a success (step 134), the method returns to normal dual bus operation (step 120). If the request is not a success, the method queries whether the failure was due to a collision (step 136). If so, the method listens for a stop (step 138). The method then queries whether the first device received a stop bit on Bus A within a predetermined timeout period (step 140). If so, the method returns to step 124 as shown.

If the first device did not receive a stop bit on Bus A within a predetermined timeout period (step 140), the first device changes the Bus A state to failure (step 142). Similarly, returning to step 136, if the method determines that the failure of the request in step 124 was not due to a collision, the first device changes the Bus A state to failure (again, step 142). Here again, the various respective modes are depicted.

As a next step, a message is sent to the second device indicating the failure of Bus A (step 144). The method then verifies that the response from device 2 indicates a failure of Bus A (Step 145). The detection process is then complete, and both devices are aware of the bus failure (step 137).

Returning to Step 122, if the method determines that the dual bus state is single master (step 122), the first device sends a request to the second device, in a manner similar to step 124 (step 126). Again, if the request is a success (step 128), the system continues to operate in a normal dual bus state (step 120). If the request is not a success, the first device changes the Bus A state to failure (step 130).

As a next step, the method waits for a request from the second device (step 132). A failure code is then sent in response to the request from the second device (step 133). The method waits for a request from the second device that confirms the failed bus (step 135). Here again, detection is complete, and both devices are now aware of the failure (step 137). The method then ends (step 146).

Figure 5:
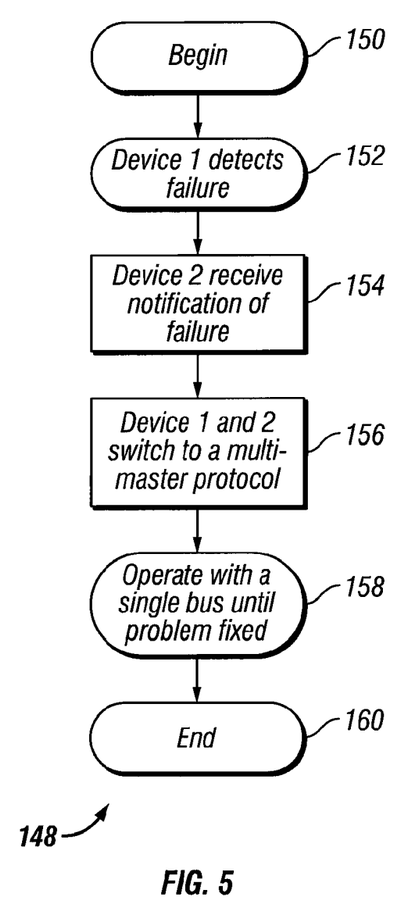
FIG. 5 illustrates a flow chart diagram of an exemplary method of operation where a first device has a failed I2C bus which is determined at runtime.

FIG. 5 illustrates an exemplary method of operation 148 where a first device has a failed I2C bus which is determined at runtime. Method 148 reflects a simplified embodiment of the method 116 as described in FIG. 4. The method 148 begins (step 150) where the first device detects a bus failure (step 152). The second device receives notification of the failure (step 154). The first and second devices then switch to a multi-master protocol (step 156), and both devices operate with a single bus until the problem is corrected (step 158). The method 148 then ends (step 160).

In additional embodiments of the present invention, devices can implement failover algorithms and procedures including the following. As a preliminary step, a data field can be added to a message or request which indicates a bus state (i.e., "Failure") and a message count (numerical). A device can then detect a failed I2C bus using methods previously described. A failover technique can then be employed, depending upon whether a Master or Slave I2C bus is at issue for a respective device, as follows.

Figure 6:
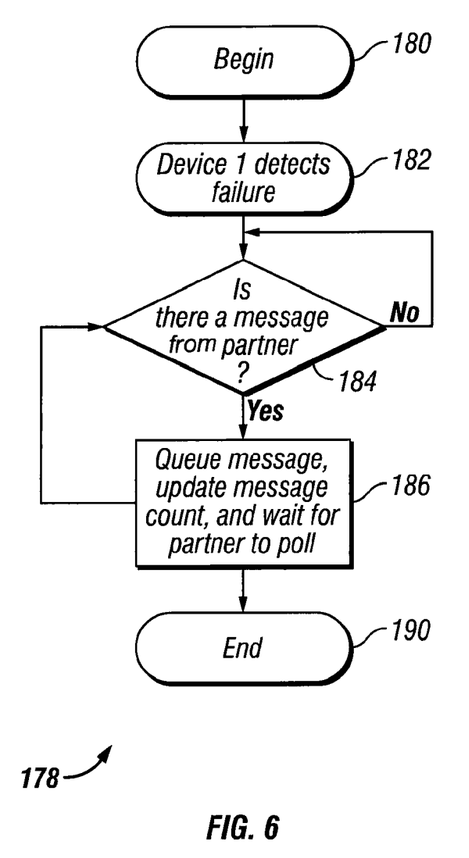
FIG. 6 illustrates a first flow chart diagram of an exemplary method of operation where a first device has a failed I2C bus which is determined at compile time.

FIG. 6 illustrates a first exemplary failover method of operation 178 for a failed bus in a single Master setup which is determined at compile time. In the present example, after beginning the process (step 180), the first remote device detects the failure (step 182), queries whether there is a message from a partner device (184), and queues the message, updates the message count, and waits for the partner device to conduct the poll (step 186). If there is no method, the device loops back until a message is received. The method 178 then ends (step 190).

Figure 7:
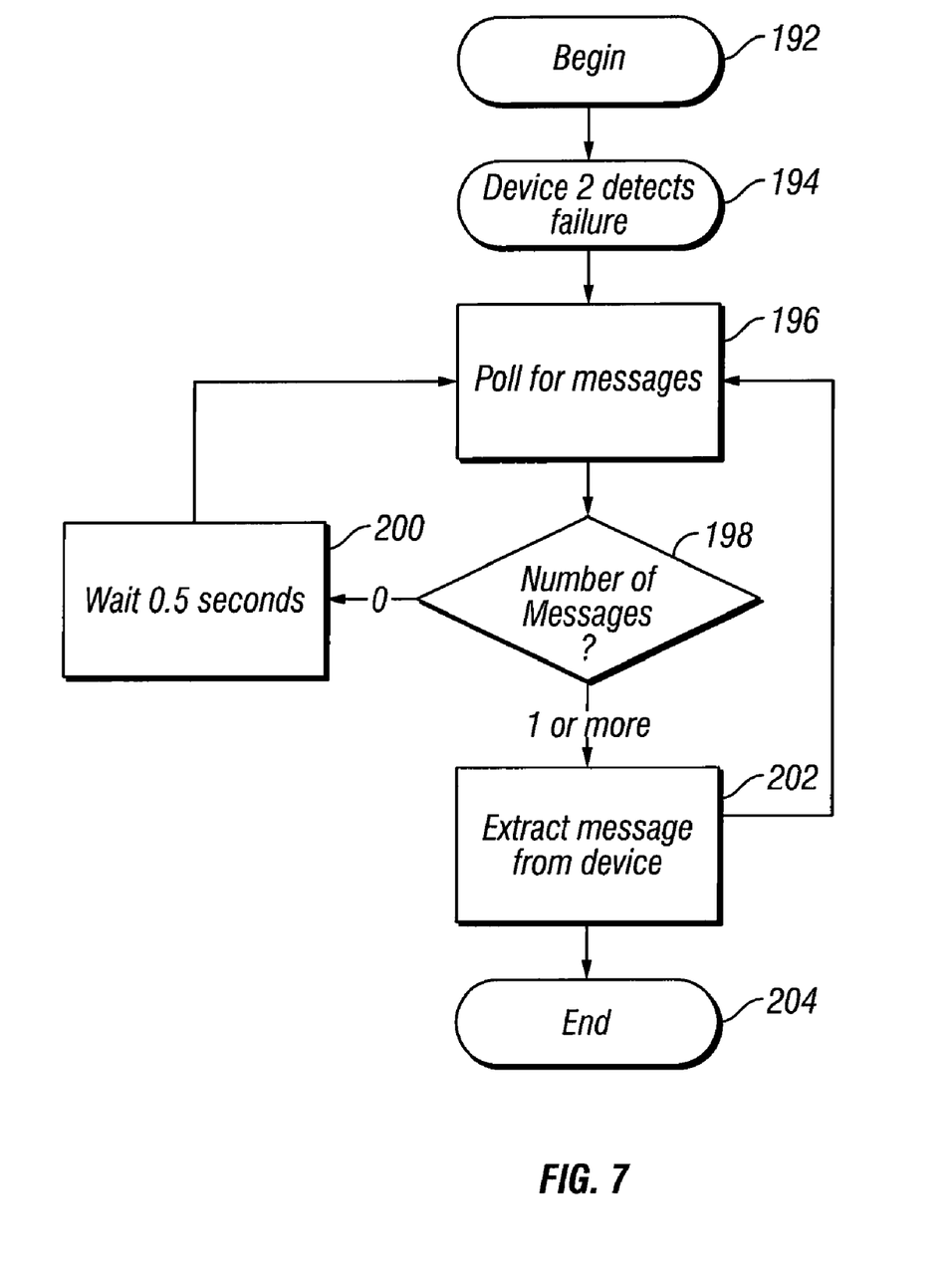
FIG. 7 illustrates a second flow chart diagram of an exemplary method of operation where a first device has a failed I2C bus which is determined at compile time.

FIG. 7 illustrates a second exemplary failover method of operation, where the second device begins (step 192) by detecting a failure (step 194), and then polling the system for any messages (step 196). If the number of messages (step 198) is equal to zero (0), the device waits a predetermined period of time (in this embodiment, 0.5 seconds) (step 200), and then re-polls for messages (step 196). If the number of messages is one or more, the device extracts the message from the device over the remaining, good I2C bus (step 202). Then, if the failure persists, the device loops back to step 196 to poll for messages. If the failure has been corrected, the method ends (step 204).

Software and/or hardware to implement the method 178, or other functions previously described, such as the described updating of a message count, can be created using tools currently known in the art. The implementation of the described system and method involves no significant additional expenditure of resources or additional hardware than what is already in use in standard computing environments utilizing RAID storage topologies, which makes the implementation cost-effective.

Implementing and utilizing the example systems and methods as described can provide a simple, effective method of managing I2C bus failure events, and serves to maximize the performance of a storage system, or overall computer system. While one or more embodiments of the present invention have been illustrated in detail, the skilled artisan will appreciate that modifications and adaptations to those embodiments may be made without departing from the scope of the present invention as set forth in the following claims.

What is claimed is:

1. A method of operation of a computer system having a master and slave Inter-IC (I2C) bus network, comprising:
   detecting and isolating a failed I2C bus;
   configuring the failed I2C bus as offline;
   reconfiguring a remaining I2C bus as a multi-mastered bus, including sending a first test request to a remote device from a local device; and
   masking the failed I2C bus from operation until the failed I2C bus can be repaired; wherein if the remote device receives the first test request:
   a remote bus mode is switched to a failure position,
   a local bus mode is switched to a multi-master position, and
   a second request is sent to the remote device to indicate position changes.

2. The method of claim 1, further including resuming a communication via a multi-master protocol over the remaining I2C bus.

3. The method of claim 1, wherein the second request is transmitted over the remaining I2C bus.

4. A method of operation of a computer system having a master and slave Inter-IC (I2C) bus network, comprising:
    detecting and isolating a failed I2C bus;
    configuring the failed I2C bus as offline;
    reconfiguring a remaining I2C bus as a multi-mastered bus, including sending a first test request to a remote device from a local device; and
    masking the failed I2C bus from operation until the failed I2C bus can be repaired; wherein if the remote device does not receive the first test request:
        a local bus mode is switched to a failure position,
        a first wait time is initiated for a second request from the remote device,
        a failure code is sent to the remote device in response to the second request,
        a second wait time is initiated for a third request from the remote device to enter a multi-master mode, and
        upon receipt of the third request, a remote bus mode is switched to a multi-master position.

5. The method of claim 4, wherein the second request is transmitted over the remaining I2C bus.

6. The method of claim 4, further including resuming a communication via a multi-master protocol over the remaining I2C bus.

7. A method of masking an Inter-IC (I2C) bus failure in a master/slave I2C bus network, comprising:
    adding a data field to messages sent over the master/slave I2C bus network to indicate a bus state and a message count; and
    detecting a failed I2C bus, wherein:
        if a first device having a failed master I2C bus has a first message for a second device, the first message is queued, the message count is updated, and the first device waits for the second device to receive a second message over the slave I2C bus, and
        if the first device having a failed slave I2C bus has the first message for the second device, the first device polls the second device, wherein:
            if the message count is zero (0), the first device waits for a predetermined period of time and re-polls the second device,
            if the message count is not zero, the first device extracts at least one message from the second device over the master I2C bus.

8. The method of claim 7, wherein detecting a failed I2C bus includes receiving a message containing a bit indicating that an I2C bus has failed.

9. The method of claim 8, further including issuing a reset command by the first device to a power switching device controlling power to a slave device operational on the first or second device.

10. The method of claim 7, including, subsequent to detecting a failed I2C bus, configuring the failed I2C to be offline.

11. A computer program product for operating a computer system having a master and slave Inter-IC (I2C) bus network, the computer program product comprising a computer-readable storage medium having computer-readable program code portions stored therein, the computer-readable program code portions comprising:
    a first executable portion for detecting and isolating a failed I2C bus;
    a second executable portion for configuring the failed I2C bus as offline;
    a third executable portion for reconfiguring a remaining I2C bus as a multi-mastered bus, including sending a first test request to a remote device from a local device; and
    a fourth executable portion for masking the failed I2C bus from operation until the failed I2C bus can be repaired; wherein if the remote device receives the first test request:
        a remote bus mode is switched to a failure position,
        a local bus mode is switched to a multi-master position, and
        a second request is sent to the remote device to indicate position changes.

12. The computer program product of claim 11, further including a fifth executable portion for resuming a communication via a multi-master protocol over the remaining I2C bus.

13. The computer program product of claim 11, further including a fifth executable portion for transmitting the second request over the remaining I2C bus.

14. A computer program product for operating a computer system having a master and slave Inter-IC (I2C) bus network, the computer program product comprising a computer-readable storage medium having computer-readable program code portions stored therein, the computer-readable program code portions comprising:
    a first executable portion for detecting and isolating a failed I2C bus;
    a second executable portion for configuring the failed I2C bus as offline;
    a third executable portion for reconfiguring a remaining I2C bus as a multi-mastered bus, including sending a first test request to a remote device from a local device; and
    a fourth executable portion for masking the failed I2C bus from operation until the failed I2C bus can be repaired; wherein, if the remote device does not receive the first test request:
        a local bus mode is switched to a failure position,
        a first wait time is initiated for a second request from the remote device,
        a failure code is sent to the remote device in response to the second request,
        a second wait time is initiated for a third request from the remote device to enter a multi-master mode, and
        upon receipt of the third request, a remote bus mode is switched to a multi-master position.

15. The computer program product of claim 14, further including a fifth executable portion for transmitting the second request over the remaining I2C bus.

16. The computer program product of claim 14, further including a fifth executable portion for resuming a communication via a multi-master protocol over the remaining I2C bus.

* * * * *